June 2, 1970  KIYOKAZU OKAMOTO ET AL  3,515,964
NUMERICALLY CONTROLLED SERVOMECHANISM INCLUDING POSITION OFFSET
Filed Jan. 22, 1968  2 Sheets-Sheet 1

INVENTORS
KIYOKAZU OKAMOTO
MASAHIRO YOSHIOKA
TAKEO ANDO
MASATOSHI SUZUKI

OSTROLENK, FABER, GERB & SOFFEN
ATTORNEYS

LEGEND
DECODER – 14 24 25
SIGNAL GEN. – 26 27
TRANSFER GATES – 22 23
DIAL UNITS – 20 21

INVENTORS
KIYOKAZU OKAMOTO
MASAHIRO YOSHIOKA
TAKEO ANDO
MASATOSHI SUZUKI

OSTROLENK, FABER, GERB & SOFFEN
ATTORNEYS

United States Patent Office 3,515,964
Patented June 2, 1970

3,515,964
NUMERICALLY CONTROLLED SERVOMECHA-NISM INCLUDING POSITION OFFSET
Kiyokazu Okamoto, Masahiro Yoshioka, Takeo Ando, and Masatoshi Suzuki, Tokyo, Japan, assignors to Nippon Electric Company Limited, Tokyo, Japan
Filed Jan. 22, 1968, Ser. No. 699,423
Claims priority, application Japan, Jan. 24, 1967, 42/4,710
Int. Cl. G05b 19/22
U.S. Cl. 318—18        5 Claims

ABSTRACT OF THE DISCLOSURE

Apparatus for automatically controlling machine tools including means responsive to a pre-programmed tape containing control signals for standardized operations and second means for pre-setting variations in machine tool operation from workpiece-to-workpiece which automatically assumes control of the first means to position the workpiece in the presence of selective signals provided in the command tape in each position in which an operation which varies from workpiece-to-workpiece is located.

---

The present invention relates to automatic machine tool devices, and more particularly to a numerical control apparatus for machine tools, and the like, including manually adjustable means for providing a command reading to perform an operation which changes from workpiece-to-workpiece, and which is rendered operative by selective signals provided in the command type.

Numerical control apparatus presently in use employs a tape having pre-programmed information for prescribing the relative motion of a tool (for example. a milling machine) with regard to an object to be worked. The pre-programmed information prescribes the direction, sense and stroke of the movement. In machine tool operations wherein the milling or other operations to be performed varies from workpiece-to-workpiece, it becomes necessary to provide separate pre-programmed tapes of each workpiece, thereby necessitating the tedious and time-consuming operation of removing the command tape and replacing it with an alternative command tape each time a workpiece requiring different operations is to be worked upon.

The present invention is characterized by providing additional apparatus to be coupled with the numerical control apparatus for greatly simplifying program information and enabling a single command tape to be employed, although the objects to be successively worked upon may require different operations.

Conventional numerical control apparatus is comprised of means for reading a command tape which automatically sets a control value into a counter means. The control value applies the pre-set number to a drive unit and feed motor which operates the table (for example) of the machine tool. A sensing device such as, for example, a pluse generator is rendered operative to generate a pulse for each incremental movement of the machine tool table which reduces the numerical value set into the counter until it reaches a zero setting, at which time the tape reader then reads the next step to be performed. This arrangement necessitates the removal and replacement of the command tape each time a workpiece requiring even slightly different operations is to be worked upon by the machine tool.

The present invention significantly increases the flexibility of such numerical control devices by providing an additional device to be coupled therewith which generates information signals corresponding to the numerical value set upon control dials which may be manipulated prior to the initiation of the milling or other machine tool operation. The information signal generating means is rendered operative upon the presence of selective signals provided in the command tape at those positions where the variations in the working operation occur, thus making it possible to employ a single command tape for controlling the machining operations of a plurality of workpieces to be operated upon in sequential fashion through the provision of means for inserting the variable operations and calling for these operations by means of the selective signals provided in the command tape.

The improved numerical control apparatus thereby provides distinct advantages over conventional control devices by greatly simplifying the program of the command tape and increasing the universality of a program for operations where it is required to repetitively perform the majoity of the operations upon a plurality of workpieces.

It is, therefore, one object of the present invention to provide a numerical control apparatus for machine tools, and the like, wherein a single command tape may be employed for controlling the machining operations of workpieces wherein the operations to be performed may vary from wrokpiece-to-workpiece.

Another object of the present invention is to provide a novel numerical control apparatus for machine tools, and the like, including pre-settable means under control of selective signals in a command tape enabling insertion of alternative machining operations which may vary from workpiece-to-workpiece while allowing the use of a single command tape in which the majority of machining operations to be performed upon a plurality of workpieces are the same for each workpiece.

These as well as other objects of the present invention will become apparent when reading the accompanying description and drawings in which.

Figure 1:
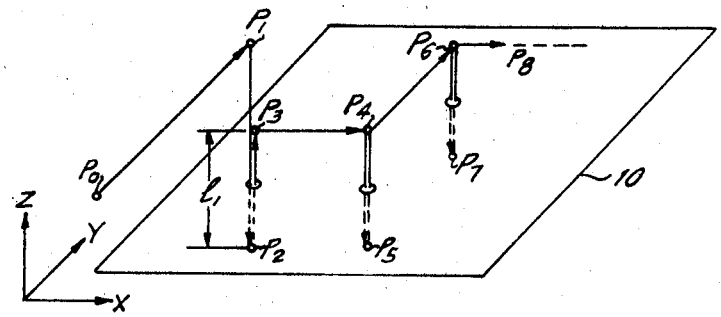
FIG. 1 is a perspective view showing in schematic fashion the strokes which may be employed by a machine tool in machining a workpiece.

The effectiveness of the present invention can best be understood from a consideration of the manner in which a machine tool is manipulated. For example, FIG. 1 shows the sequence and direction of strokes undertaken by a machine tool in operating upon a workpiece. As one example, let it be assumed that it is desired to drill a plurality of holes in a workpiece 10 at specific locations along the surface of the workpiece. FIG. 1 shows a plurality of strokes which indicate the path of movement of the pointed end of a tool (i.e., a drill).

As shown in FIG. 1, the pointed end of the tool begins from a rest position $P_0$ and follows the path $P_0$–$P_1$ (parallel to the Y axis); $P_1$–$P_2$ (parallel to the Z axis); $P_2$–$P_3$ (parallel to the Z axis); $P_3$–$P_4$ (parallel to the X axis); $P_4$–$P_5$ (parallel to the Z axis); $P_5$–$P_4$ (parallel to the Z axis); $P_4$–$P_6$ (parallel to the Y axis); $P_6$–$P_7$ (parallel to the Z axis); $P_7$–$P_6$ (parallel to the Z axis); $P_6$–$P_8$ (parallel to the X axis); and so forth. The operation of FIG. 1 may be considered to be one of boring holes in a printed circuit board. The program employed by the conventional numerical control apparatus must contain all of the numerical information corresponding to each stroke of every path set forth above.

Let it be assumed that it is desired to alter the location of one of the holes to be drilled in the workpiece 10 or to eliminate one of the holes in the workpiece 10 for a number of workpieces which otherwise require all of the identical boring operations. This requires an alteration for elimination of certain of the strokes to be performed, necessitating the removal of the command tape from the numerical control apparatus and the insertion of an alternative tape or an alteration of the removed command tape which may then be reinserted in the numerical control apparatus to command the operations of the machine tool in machining the next workpiece. This makes the use of conventional numerical control apparatus quite tedious and time-consuming. The numerical control apparatus of the present invention greatly simplifies the machining operations by providing means for setting the numerical value of a stroke such as, for example, the stroke $l_1$ upon pre-settable dials and by preparing a command tape which is provided with selective signals for the selection of digital information corresponding to the numerical value set in the dials. This means that if the length of the stroke $l_1$ is to be altered from workpiece-to-workpiece, the command tape need only call for the altered numerical value for the stroke $l_1$ of each section $P_2$–$P_3$, $P_4$–$P_5$, $P_5$–$P_4$, $P_6$–$P_7$, $P_7$–$P_6$, ..., so as to greatly simplify operation of the numerical control apparatus. Since the length of the stroke may be the only operation requiring alteration from workpiece-to-workpiece, with the use of the present invention, it is sufficient to simply change the numerical value set on the dials allowing use of the same command tape for each and every workpiece.

Figure 2:
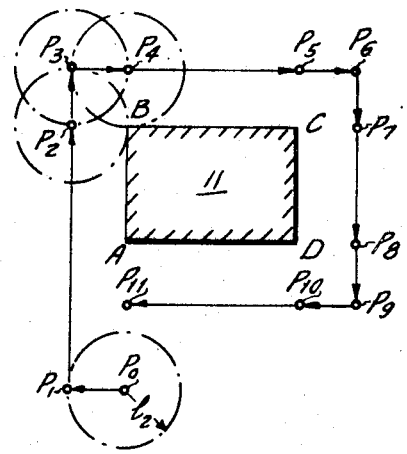
FIG. 2 is a top plan view showing the strokes which may be performed by a machine tool in machining a workpiece.

In the milling operation shown in FIG. 2 wherein a workpiece 11 is to be machined so as to have the shape A, B, C, D, the cutting tool having a cutter radius $l_2$ moves along the path from $P_0$ through to the final point $P_{11}$. Each of the strokes $P_0$–$P_1$, $P_2$–$P_3$, $P_3$–$P_4$, $P_5$–$P_6$, $P_6$–$P_7$, $P_8$–$P_9$, and $P_9$–$P_{10}$ all have a stroke length equal to the cutter radius $l_2$. The operation being performed is that of a cutter device which moves along the path from $P_0$ through to $P_{11}$ to cut the workpiece 11 so that its final shape is defined by the rectangle A, B, C, D. Conventional numerical control apparatus for machine tools must be provided with a command tape in which the numerical values for each stroke (measured from the center of the cutter tool) are provided in the command tape, which values $P_0$–$P_1$—$P_3$–$P_6$—$P_9$–$P_{11}$ are calculated in accordance with the distance $P_{0A}$ the final shape of the workpiece 11, namely the shape A, B, C, D and the cutter radius $l_2$ of the cutter tool being employed.

When a tool having a cutter radius which is different from that described above (i.e., which has a cutter radius either greater or less than $l_2$) the path of the tool center must be correspondingly altered, thereby requiring the replacement of the orignal command tape with a substitute command tape. The above tedious and time-consuming steps can be eliminated through the use of a numerical control apparatus employing a conventional cutter radius corrector. The operation of such apparatus is that corrected paths are automatically obtained by combining the information which represents the work path and the information which represents the cutter radius value, all of which values must be inserted into the command tape as separate instructions. The composition of such apparatus requires the provision of a complicated and expensive control device for combining the above described information.

The present invention completely eliminates the need for such a complicated and expensive cutter radius correction device by providing pre-settable dial means which are set just prior to the time of the machining operation with the numerical value corresponding to the cutter radius $l_2$. The command tape is then provided with selective marking signals which are employed to select the digital information corresponding to the numerical value set on the pre-settable dials. The information set in the pre-settable dials thus represents the cutter radius $l_2$ which is equal to the length of each of the paths $P_0$–$P_1$, $P_2$–$P_3$, $P_3$–$P_4$, $P_5$–$P_6$, $P_6$–$P_7$, $P_8$–$P_9$, $P_9$–$P_{10}$. This arrangement thereby greatly simplifies the milling machine operation by enabling the use of a single command tape for controlling the machining of a plurality of workpieces wherein the cutter radius varies from workpiece-to-workpiece. In addition, the cutter radius numerical value $l_2$ of the tool actually used is set at the time that the machining operation is initiated and, since the command tape can be used irrespective of the cutter radius value, the present invention performs substantially the same functions of conventional numerical control devices provided with cutter radius correctors, which functions, however, are performed through the use of greatly simplified circuitry to be more fully described.

In addition, the present invention can be distinguished from conventional numerical control apparatus in which the command tape includes both information indicating the working path and information indicating the value of cutter radius; while the present invention selects and uses the above described categories of information independently as the information representing the strokes of the respective paths. As one example, in considering the path from $P_4$ to $P_8$, the command tape provides the working path numerical information to move the cutter to point $P_5$; the command tape then places the cutter tool under control of the pre-settable dial means which provides the numerical information to move the machine tool to point $P_6$ and then to point $P_7$, at which time the command tape then provides the next numerical value moving the cutter to point $P_8$, thus providing a greatly simplified machining operation as compared with conventional devices.

Figure 3:
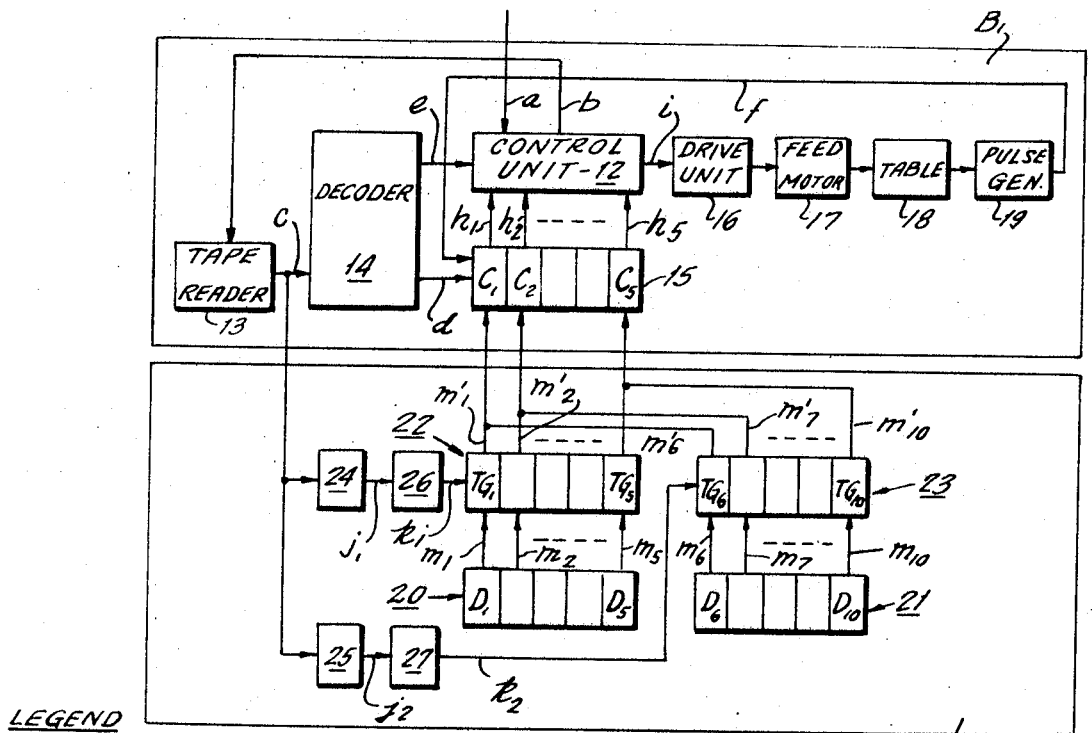
FIG. 3 is a block diagram showing a numerical control apparatus employing the principles of the present invention.

FIG. 3 shows a numerical control apparatus designed in accordance with the principles of the present invention. The apparatus designated $B_1$ is an example of a conventional numerical control apparatus. The device designated by $B_2$ is an example of a unit added to the apparatus $B_1$ in order to constitute the numerical control apparatus of the present invention.

The apparatus $B_1$ operates as follows:

A start command signal $a$ is applied from an external device (not shown) which may, for example, be a start pushbutton, to a control unit 12. The control unit 12 responds to the start command by generating a read signal $b$ which is applied to a tape reader 13. Tape reader 13 begins reading a tape (not shown in FIG. 3 for purposes of simplicity) under control of the read signal $b$ and transmits an output signal $c$ representative of the first signals provided in the tape, which output signal is applied to a decoder 14. Decoder 14 decodes the signal $c$ and transmits the signal $d$ which signifies a stroke to a binary decimal five-digit pre-set counter comprised of counter stages $C_1$, $C_2$, ... $C_5$ which causes the numerical control signal $d$ to be set therein.

Decoder 14 generates a signal $e$ indicating that the reading operation of the numerical control signal has been completed. This signal is applied to control unit 12 which, responsive thereto, generates a drive signal $i$. The drive signal is applied to a drive unit 16 which receives the signals $h_1, h_2 \ldots h_5$ which represent the contents of the pre-set counter 15 comprised of stages $C_1, C_2 \ldots C_5$. The signals are continuously applied to drive unit 16 until the contents of counter 15 are decreased to zero.

Drive unit 16 amplifies the drive signal $i$, causing a feed motor to be set into motion which, in turn, moves a table 18 forming one part of a machine tool (the remainder of which has not been shown for purposes of simplicity). The movement of table 18 is detected by a pulse generator 19 which generates a pulse each time table 18 is moved by a predetermined incremental amount. These detection pulse signals $f$ are applied to the lowest digit position in stage $C_1$ of pre-set counter 15. The pulses applied in line $f$ are subtractive pulses, causing the count in counter 15 to be reduced by one unit each time a pulse is applied thereto. When the contents of pre-set counter 15 is reduced to zero, control unit 12, detecting this state, terminates drive signal $i$ and transmits another read signal $b$ to tape reader 13, causing the tape reader to read the information necessary for performing the next operation. It can thus be seen that the table 18 of the machine tool (not shown) can be moved in incremental fashion to complete one stroke of an overall operation including a plurality of strokes wherein each stroke corresponds to a numerical control signal $d$ which is pre-set due to the plural stages of pre-set counter 15.

The improved apparatus of the present invention is comprised of the conventional apparatus designated by numeral $B_1$ which is combined with the unit $B_2$. The composition and operation of unit $B_2$ are as follows:

The unit is comprised of first and second pre-settable dials 20 and 21, respectively, each having settable decimal portions $D_1$ through $D_5$ and $D_6$ through $D_{10}$, respectively. Each portion $D_n$ is capable of setting a decimal numerical value so that each dial member 20 and 21 is capable of setting up a numerical value of five decimal digits in length, which dials generate digital information $m_1$ through $m_{10}$ which correspond, respectively, to the numerical values set in the dials. The digital information is respectively applied to first and second transfer gates 22 and 23, resectively, which in turn are comprised of individual transfer gates $TG_1$ through $TG_5$ and $TG_6$ through $TG_{10}$, respectively, which are capable of transferring the binary decimal information applied thereto from pre-settable dials 20 and 21 into pre-settable counter 15, which operation takes place in a manner to be more fully described. The digital information thus applied may then be used by the unit $B_1$ to control the particular stroke to be performed.

Each of the transfer gates 22 and 23 is rendered operative (in a selective fashion) by means of decoders 24 and 25, respectively, and signal generators 26 and 27, respectively. Each signal generator generates selective signals $k_1$ and $k_2$, respectively, which select the digital information $m_1$ through $m_5$ and $m_6$ through $m_{10}$ at the time that the tape reader 13 reads a selective signal $R_1$ and $R_2$, respectively, which signals are punched or otherwise provided on the command tape (which may be a punch paper tape or a magnetic tape, for example).

When tape reader 13 reads the slective signal $R_1$, for example, this signal appears in output line $c$ and is applied simultaneously to decoder 14 and decoders 24 and 25. Decoder 24 decodes the signal and generates the trigger signal $j_1$ for the purpose of actuating signal generator 26. Signal generator 26, which may, for example, be a monostable circuit such as a monostable flip-flop or one-shot multivibrator, applies the selective signal $k_1$ to the enabling inputs (to be more fully described) of the transfer gate 22 each time the signal generator 46 receives the trigger pulse signal $j_1$.

When the enabling pulse is applied to transfer gate 22, the pre-set information in the dial unit 20 is transferred through the transfer gates and set into pre-set counter 15 through stages $C_1$ through $C_5$ received as digital information $m_1'$ through $m_5'$ which appears at the output terminals of the transfer gate 22. Subsequent operation of the apparatus $B_1$ occurs in the same manner as was previously described. Thus, the table 18 can be moved by a stroke having a length dictated by the digital information set into pre-set counter 15 from the dial unit 20.

The operation of decoder 25, signal generator 27, transfer gate 23 and dial unit 21 is substantially identical to that described above in that when the selective signal $R_2$ is read by tape reader 13, decoder 25 generates the trigger signal $j_2$ activating signal generator 27. Signal generator 27 generates the transfer gate signal $k_2$ enabling transfer gate 23 to pass the binary decimal information in dial unit 21 through the transfer gate 23 to be set into pre-settable counter 15. Thus, in addition to those command signals stored in the command tape (not shown), the table 18 may further be placed under the control of numerical information set into the dial units, which numerical information can be called for by providing suitable selective signals in the command tape. Whereas two dial units have been shown in FIG. 3, it should be understood that a greater or lesser number may be provided, depending only upon the needs of the user. Obviously, additional dial units require only that the command tape be provided with additional selective signals which may be distinguishable from one another so that only the proper decoder (14, 24 or 25) will be activated.

Figure 4:
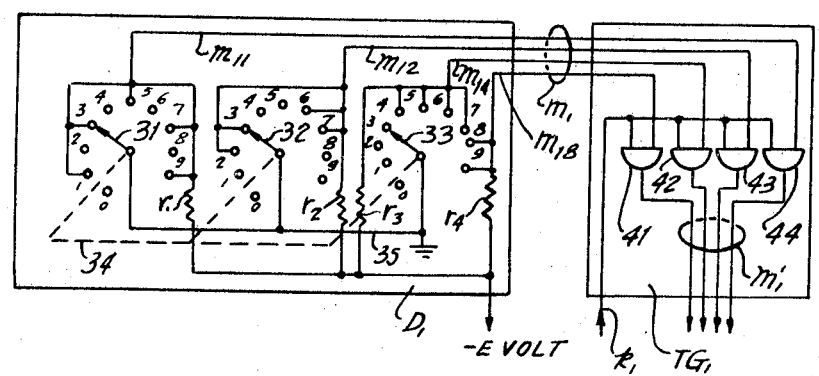
FIG. 4 is a schematic diagram showing the pre-settable dial means and trigger gates of FIG. 3 in greater detail.

FIG. 4 is a schematic diagram showing one stage $D_1$ of a dial unit and showing one stage $TG_1$ of a transfer gate. Unit $D_1$ is in turn comprised of a three-stage rotary switch, with each stage being comprised of rotary arm 31 through 33, respectively, which is selectively engageable with a plurality of contacts arranged in substantially circular fashion about their associated rotary arm. The three rotary arms are mechanically coupled, as indicated by the dotted line arrangement 34, so that all three rotary arms may be simultaneously moved, as is conventional in ganged switch structures. Each rotary arm 31 through 33 has associated therewith ten stationary contacts corresponding, respectively, to the numerical values 0 through 9. Conductors $m_{11}$, $m_{12}$, $m_{14}$ and $m_{18}$ correspond, respectively, to the decimal numbers 1, 2, 4 and 8. Each one of these conductors is connected through a resistor $r_1$, $r_2$, $r_3$ and $r_4$ to a power source having a value $-E$ volts. The opposite end of each conductor is respectively connected to one input terminal of an associated AND gate 41 through 44 provided in the transfer gate structure $TG_1$.

When a decimal number is set on the dial component $D_1$ of the pre-settable dial, the binary decimal coded group of information signals $m_1$ appears in the conductors $m_{11}$ through $m_{18}$ such that the decimal value of the number $m_1$ is a combination of voltages of binary digits corresponding to the decimal number. As some examples, let it be assumed that the value 0 is to be set into the dial. It can be seen that the 0 contacts of the three rotary switches are not connected to the lines $m_{11}$ through $m_{18}$ so that no signals (i.e., $-E$ volts) will be applied to the AND gates 41 through 44; in the case where the decimal number 1 is set into the dial unit, rotary arms 31 through 33 engage their "1" contacts. In this arrangement only rotary arm 31 provides a path to ground potential, while the remaining two rotary arms are open-circuited. The current path for rotary switch arm 31 extends from $-E$ volts through resistor $r_1$, contact "1" rotary arm 31 and bus 35 to ground potential. In the case where the decimal number 3 is set into the dial unit $D_1$, current paths of the type set forth above are established for rotary arms 31 and 32, as shown in solid fashion in FIG. 4, while rotary arm 33 remains open-circuited. It can clearly be seen that this switch arm structure sets up a binary coded decimal representation for the decimal number set into the dial unit which is constituted of four binary bit positions. Considering the examples previously given, the decimal number 0 is represented by the binary code 0000; the decimal number 1 is represented by the binary code 1000 (reading from the left rotary arm 31 toward the right rotary arm 33); decimal number 2 is represented by the binary code 0100; and so forth. The conductors $m_{11}$ and $m_{12}$ are at 0 volts, and the conductors $m_{14}$ and $m_{18}$ are at $-E$ volts when the decimal 3 is set into dial unit $D_1$, where ground potential and $-E$ volts represent binary 0 and binary "1", respectively.

Transfer gate $TG_1$ is provided with four AND gates 41 through 44, each having a first input terminal connected in common to the selective signal input lead $k_1$. The remaining input terminals are each connected to an associated conductor $m_{11}$ through $m_{18}$. The AND gates 41 through 44 are normally disabled, preventing the binary coded decimal information set into dial unit $D_1$ from being passed to counter unit 15. When a selective signal is applied to line $k_1$, all of the AND gates 41 through 44 are simultaneously enabled, causing the information set in dial $D_1$ to be passed through transfer gate unit $TG_1$ and applied into the first stage $C_1$ of pre-settable counter 15 which is capable of storing four binary bits. It should be understood that the remaining stages $D_2$ through $D_5$ of dial unit 20 and $D_6$ through $D_{10}$ of dial unit 21 are substantially identical in design and operation to the dial unit of FIG. 4. In a like manner, the transfer gates $TG_2$ through $TG_5$ of transfer gate 22 and $TG_6$ through $TG_{10}$ of transfer gate 23 are substantially identical in design and operation to the transfer gate shown in FIG. 4.

The decoders 24 and 25 can easily be formed through the use of diode gates forming AND gates, for example, which are enabled only when the particular combination of signals are applied thereto. The signal generators 26 and 27 may, be, for example, conventional monostable circuits such as, for example, one-shot multivibrators. From a consideration of the above description, the components necessary for constructing the unit $B_2$ of the present invention can be materialized in a simple straightforward fashion and at a very low cost. In addition, the effectiveness of the apparatus of the present invention has the advantage of extremely simplifying the machine tool program and greatly increasing the universality in use of the program.

Although this invention has been described with respect to its preferred embodiments, it should be understood that many variations and modifications will now be obvious to those skilled in the art, and it is preferred, therefore, that the scope of the invention be limited not by the specific disclosure herein, but only by the appended claims.

What is claimed is:

1. In a machine tool control device for including:
a tape reader for reading a command tape having command and selective information to generate signals representative of the information provided in the tape;
counter means;
first decoder means coupled to said reader for transferring the information signals representing a command count into said counter means;
drive means for driving the machine tool;
control means responsive to signals transferred to said counter means for incrementally energizing said drive means;
pulse generator means responsive to incremental movement of the machine tool under control of the drive means for reducing the count in said counter;
said control means further comprising means responsive to a predetermined count in said counter means for stopping said drive means and advancing said tape reader;
the improvement comprising:
a register;
manually settable dial units for setting information in said register;
second decoder means coupled to said tape reader and responsive to selective information in said tape for generating a transfer signal;
normally disabled transfer gate means coupled between said register and said counter means for transferring the contents of said register into said counter means.

2. The control device of claim 1 wherein each of said dial units is further comprised of movable dial means each having a plurality of discrete settings;
switch means coupled to said dial means for generating a plurality of groups of binary coded signals each representative of an associated dial setting.

3. In a machine tool control device for including:
a tape reader for reading a command tape having command and selective information to generate signals representative of the information provided in the tape;
counter means;
first decoder means coupled to said reader for transferring the information signals representing a command count into said counter means;
drive means for driving the machine tool;
control means responsive to signals transferred to said counter means for incrementally energizing said drive means;
pulse generator means responsive to incremental movement of the machine tool under control of the drive means for reducing the count in said counter;
said control means further comprising means responsive to a predetermined count in said counter means for stopping said drive means and advancing said tape reader;
the improvement comprising:
a group of registers;
a group of manually settable dial units for setting information in their associated registers;
a group of second decoder means coupled to said tape reader, each being responsive to different selective information in said tape for generating a transfer signal, whereby the selective information for each decoder of said group of second decoders is different from the selective information for every other decoder of said second group of decoders;
normally disabled transfer gate means coupled between said register and said counter means for transferring the contents of said registers into said counter means.

4. In a numerical control device for machine tools comprising:
a tape reader for converting programmed information read from a command tape into control signals;
said programmed information including select and first numerical control information;
counter means for storing numerical information;
first decoder means responsive to signals representing first numerical control information for transferring said information into said counter means;
drive means responsive to the presence of numerical control information in said counter means for driving the machine tool;
pulsing means responsive to movement of the machine tool for reducing the numerical information in said counter means for each incremental unit of movement undertaken by said machine tool;
the improvement comprising:
adjustable dial means having a plurality of discrete settings;
converter means controlled by said dial means for generating a different group of second numerical control information signals for each setting of said dial means;
normally disabled gate means coupled between said converter means and said counter means for selectively transferring said second numerical control information signals to said counter means;
second decoder means coupled to said tape reader for enabling said gate means upon the receipt of a select information signal.

5. The control device of claim 4 wherein said adjustable dial means is further comprised of a plurality of ganged switches each having a movable contact arm selectively engageable with any one of a plurality of stationary contacts, all of said movable contact arms being mechanically coupled in common;
said converter means including a plurality of gating circuits each being coupled to selected stationary contacts of selected ones of said ganged switches for generating a binary decimal code representative of each of the discrete positions of said movable arms, each of said discrete positions representing an analog quantity.

References Cited

UNITED STATES PATENTS

| | | |
|---|---|---|
| 3,209,222 | 9/1965 | Holy. |
| 3,211,896 | 10/1965 | Evans et al. |
| 3,218,532 | 11/1965 | Toscano. |
| 3,327,101 | 6/1967 | Evans. |
| 3,343,053 | 9/1967 | Toscano et al. |

THOMAS E. LYNCH, Primary Examiner

U.S. Cl. X.R.

235—151.11; 318—162